Jan. 21, 1947.  W. T. STEPHENSON ET AL  2,414,776
APPARATUS FOR MAKING PIPE FROM THERMOPLASTIC RESIN
Filed Oct. 7, 1944  3 Sheets-Sheet 1
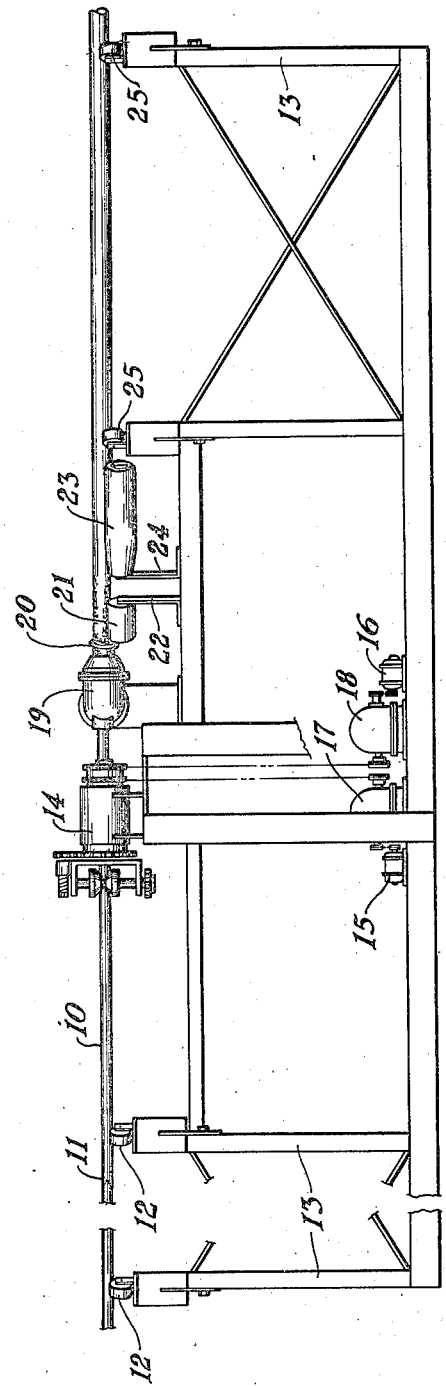
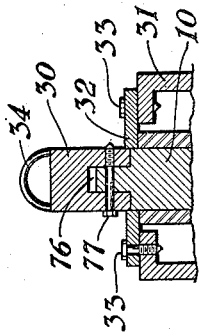
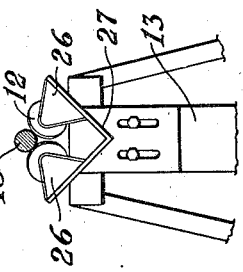
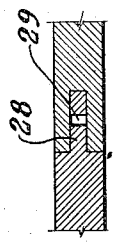
INVENTORS
Wilbur T. Stephenson
BY James A. Palmer
Griswold & Burdick
ATTORNEYS Jan. 21, 1947. W. T. STEPHENSON ET AL 2,414,776
APPARATUS FOR MAKING PIPE FROM THERMOPLASTIC RESIN
Filed Oct. 7, 1944 3 Sheets-Sheet 2

INVENTORS
Wilbur T. Stephenson
BY James A. Palmer

Griswold & Burdick
ATTORNEYS

Jan. 21, 1947. W. T. STEPHENSON ET AL 2,414,776
APPARATUS FOR MAKING PIPE FROM THERMOPLASTIC RESIN
Filed Oct. 7, 1944 3 Sheets-Sheet 3

INVENTORS
Wilbur T. Stephenson
BY James A. Palmer

Griswold & Burdick
ATTORNEYS

Patented Jan. 21, 1947

2,414,776

UNITED STATES PATENT OFFICE 2,414,776

APPARATUS FOR MAKING PIPE FROM THERMOPLASTIC RESIN

Wilbur T. Stephenson, Midland, and James A. Palmer, Chicago, Ill., assignors to The Dow Chemical Company, Midland, Mich., a corporation of Michigan Application October 7, 1944, Serial No. 557,610

1 Claim. (Cl. 18—14)

This invention relates to apparatus for making pipe from thermoplastic substances. It more particularly concerns apparatus for making pipe from a thermoplastic resin having properties similar to those of polymeric vinylidene chloride.

The term "polymeric vinylidene chloride" as used herein and in the appended claims is intended to include polymers, co-polymers and interpolymers of vinylidene chloride wherein the vinylidene chloride is present in substantial amount.

In attempting to produce pipe of relatively large diameter and substantial wall thickness, e. g. of a diameter above about one-half inch, from a thermoplastic substance, such as polymeric vinylidene chloride, by extruding it through a conventional die in a softened or molten state, satisfactory results are not obtained due to the tendency of the pipe to sag and collapse before it can be cooled to the extent that the tube walls are self-supporting. Difficulty is also experienced, when employing the above procedure, in keeping the wall thickness and diameter of the pipe uniform and within the desired tolerances. These difficulties are especially apparent when the formation of pipe of large diameter or having thin walls is attempted. Generally speaking, the formation of such thermoplastic pipe on an industrial scale has not heretofore been possible. The utility of such larger sized thermoplastic pipe is apparent.

It is, therefore, an object of the present invention to provide apparatus for making pipe from a thermoplastic substance. An additional object is to provide a continuous method for making thermoplastic pipe in any desired lengths.

These and related objects are accomplished readily by first depositing a layer of a molten thermoplastic substance on a mandrel, which has a diameter substantially equal to the inside diameter of the desired thermoplastic pipe, while the mandrel is being rotated around, and forwarded in the direction of, its longitudinal axis. Following the deposition of the layer of thermoplastic substance on the mandrel and while the latter is still being forwarded and rotated, the hot thermoplastic layer or coating is rolled in a direction transverse to the longitudinal axis of the mandrel. Such rolling serves to regulate the thickness of the thermoplastic coating and to smooth its surface. After the smoothed thermoplastic layer on the mandrel has cooled sufficiently to be self-supporting, it is stripped from the mandrel and there is thus obtained a thermoplastic pipe of uniform dimensions and having the desired internal diameter and wall thickness.

The rolling operation is usually, although not necessarily, carried out conveniently in two steps. The mandrel is forwarded past a first roller, which serves principally to regulate the thickness of the layer of thermoplastic substance, and then past a second roller of somewhat different contour than the first, which serves to smooth the thermoplastic coating on the mandrel. Although idler rolls are ordinarily used, they may, if desired, be driven. The process may be adapted to the continuous production of thermoplastic pipe in any desired lengths by using a sectional mandrel, the individual sections of which have substantially the same length as that of the desired lengths of pipe, and depositing the thermoplastic substance continuously along its length. As soon as the plastic layer on the forward section of the mandrel has cooled and solidified, the thermoplastic pipe is cut through at the junction of the said section with the next succeeding section, the forward section is disjoined from the succeeding section, and the severed length of thermoplastic pipe then stripped from the disjoined section. The latter may then be used as an added section of the uncoated traveling mandrel and the process kept up continuously and indefinitely, if desired.

Reference is made to the accompanying drawings in which, in the interst of clarity, certain features are shown on a somewhat exaggerated scale and wherein, Figure 1 is a diagrammatic side elevation of apparatus for producing pipe from a thermoplastic substance;

Figure 2 is an end view of cradle rollers for supporting and guiding the mandrel of Figure 1;

Figure 3 is a side sectional elevation of the mandrel of Figure 1 showing means for fitting two sections of the mandrel together;

Figure 4 is a sectional view of apparatus for stripping a thermoplastic pipe from the mandrel of Figure 1;

Figure 5:
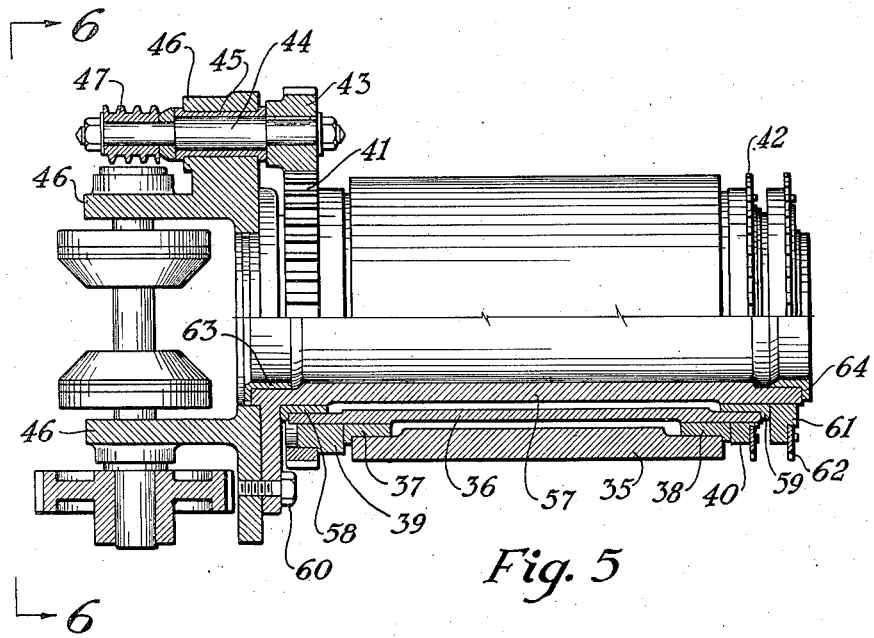
Figure 5 is an elevation, partly in section, of apparatus for forwarding and rotating the mandrel of Figure 1.

Referring to Figure 1, a sectional mandrel 10, jointed as at 11, rests in paired cradle rollers 12 which are supported on a stationary framework 13. The mandrel 10 is forwarded and rotated by forwarding and rotating apparatus 14 driven by motors 15 and 16 through variable speed drives 17 and 18. The traveling and rotating mandrel passes through an extrusion head 19 in which a continuous coating 20 of a thermoplastic substance is deposited on the mandrel.

After leaving the extrusion head, the mandrel bearing a rough coating of thermoplastic material moves past rolls 21 and 23 carried on adjustable supports 22 and 24. The first of these rolls 21, conveniently designated as a sizing roll for the thermoplastic coating on the mandrel, is inclined slightly in the plane of the longitudinal axis of the mandrel so that its longitudinal axis forms an angle of from 1° to 10°, preferably about 3°, with the longitudinal axis of the traveling mandrel. The axis of the roll diverges from the axis of the mandrel in the direction of travel of the latter. By adjusting the roll support 22, the distance of the roller 21 from the surface of the mandrel may be adjusted to a predetermined distance and the thickness of the coating on the mandrel passing the roll thereby regulated. Any excess of thermoplastic substance deposited on the mandrel within the die head 19 over that required to produce a pipe of the desired wall thickness is retained as a soft ridge in front of the roller 21 by the rotary scraping or plowing action thereof so that when the mandrel has passed the roller 21 only the desired amount of thermoplastic substance is carried by it. Considerable smoothing of the surface of the thermoplastic substance on the mandrel is also effected by the sizing roller 21.

The traveling and rotating mandrel carrying its sized and partially smoothed thermoplastic coating then passes the roller 23, designated herein as a smoothing roller. The smoothing roller 23 is inclined to the mandrel at about the same angle as the sizing roller 21. The forward end of the smoothing roller 23, e. g. the end nearest the sizing roller, is preferably of somewhat less diameter than the main body of the roller, the diameter of the roller increasing gradually from the small forward end to the larger central portion. The last half or more of the roller 23 is preferably of constant diameter. The distance of the roller 23 from the mandrel may be altered by means of the adjustable support 24 so that, when the thermoplastic-covered mandrel rotates and moves past the roller 23, the latter smooths the thermoplastic coating, although, unlike the sizing roller, it does not regulate or alter the amount of thermoplastic material carried forward by the mandrel.

The coated mandrel, after it passes the smoothing roller 23, is supported in its further travel by paired cradle rollers 25 in much the same manner that the uncoated mandrel is supported by the paired cradle rollers 12, the principal difference being that, whereas the rollers 12 are inclined in the direction of travel of the mandrel in such manner that they tend to forward it in the direction of its travel, the rollers 25 are inclined in the opposite direction and tend to retard the travel of the mandrel. These two opposing tendencies insure that the different sections of the mandrel which are joined, as at 11, but which are not secured together, do not come apart.

After the mandrel bearing the smoothed coating has traveled sufficiently far for the coating to become cool and self-supporting, either by spontaneous cooling or as the result of its being sprayed with water or otherwise cooled, the coating is cut through at the points where the sections of the mandrel are joined and the section bearing the hardened coating disjoined from the succeeding section. The plastic pipe which forms a coating on each section of the mandrel is then stripped from the section, as will be explained in detail later, and the section joined as a new section to the traveling mandrel. In this way a series of joined mandrel sections is continuously being forwarded and the process may thus be run continuously.

Thermoplastic pipe of substantially any length may be made by using a mandrel, the sections of which are of the desired length. The internal diameter of the thermoplastic pipe so formed is determined by the external diameter of the mandrel used. The wall thickness of the thermoplastic pipe is determined by the adjustment of the sizing roller 21. Thermoplastic material is fed to the pipe making machine at such a rate that there is always a small excess being retained ahead of the sizing roller 21. In this way, full wall thickness of the pipe is maintained at all times. Should the amount of thermoplastic substance retained by the sizing roller 21 become excessive, the feed of thermoplastic substance to the extrusion head 19 is merely reduced somewhat.

The cradle rollers 12 and 25 for supporting and guiding the mandrel are arranged in pairs and are adjustably supported in any suitable way. One such way is shown clearly in Figure 2. Bearing support members 26 are welded to bearing support base members 27 and the latter secured with bolts located in slots in a member of the framework 13, so that the entire assemblage may be raised or lowered to accommodate mandrels of different diameters.

One method of joining the sections of the mandrel is shown clearly in Figure 3, wherein one end of each section is formed with a tongue 28 and the adjoining end of the section is formed with a corresponding groove. The tongue on each mandrel section has a hole 29 drilled through it.

When it is desired to strip the thermoplastic pipe from a section of mandrel, the section, after being disjoined from adjacent sections, is fitted with a short length of metal rod 30, of Figure 4, having substantially the diameter of the mandrel and carrying on one end a ring 34 and in the other a groove 76 to receive the tongue on the end of the mandrel. Holes are drilled through the sides of the groove in the end of the metal rod to match the hole in the mandrel tongue so that by inserting a pin 77 the mandrel 10 may be locked securely to the short length of metal rod 30. The member 30 is then passed through a block 31 having a hole therein of somewhat greater diameter than the outside diameter of the thermoplastic pipe and having a plate 32 over one end of the hole and secured firmly to the block 31, e. g. by bolts 33. A hole in the plate of the same diameter as the mandrel is centered with the hole in the block. By means of the ring 34 in the member 30 and suitable pulling means, the mandrel is pulled through the hole in the plate 32 out of the thermoplastic pipe which is retained by the plate 32. The thermoplastic pipe may then be cut to exact lengths and threaded or operated upon in any other desired manner.

Figure 6:
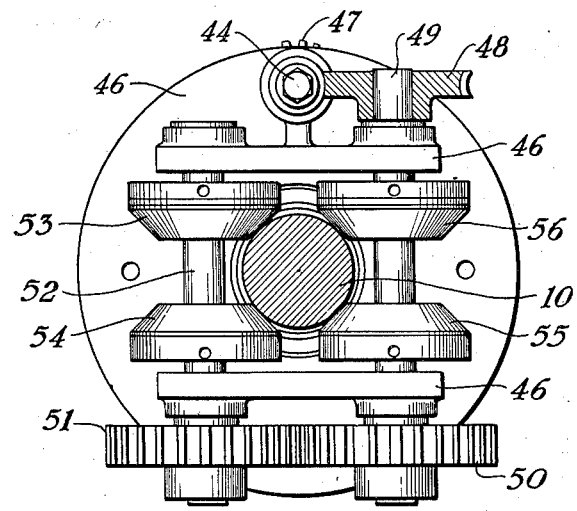
Figure 6 is an end view of the apparatus of Figure 5 taken along the line 6—6.

Referring to Figures 5 and 6, there is shown, in more detail, the mandrel forwardly and rotating apparatus shown generally at 14 of Figure 1. This apparatus includes a fixed outer housing 35. A sleeve 36 extends through the housing 35 and is adapted to rotate in fixed bearings 37 and 38 placed in both ends of the housing. Either end of the sleeve 36 is provided with annular ring members 39 and 40 at the portals of the bearings 37 and 38, thus preventing end play. A ring gear 41 is attached to ring 39, while a sprocket 42 is attached to ring 40. Ring gear 41 meshes with a spur gear 43, the latter being suitably mounted on a shaft 44, which is adapted to turn in a bearing 45 fixedly mounted on the head member 46. The other end of the shaft 44 is provided with a worm 47, which meshes with a worm gear 48 as is shown in more detail in Figure 6. The worm gear 48 is secured to a shaft 49 mounted in suitable bearings in the head member 46. At the opposite end of the shaft 49 there is mounted a spur gear 50, which meshes with a second spur gear 51 mounted on a second shaft 52 similar to shaft 49. Identical tapered roll members 53, 54, 55, and 56 are adjustably mounted in spaced relation on shafts 49 and 52 and are arranged to grip the mandrel 10 and impart forwardly movement thereto as the sleeve 36 is rotated. The head member 46 is secured to an inner sleeve, 57 of Figure 5, which is mounted in bearings 58 and 59 fixed to the outer sleeve 36. Bolts 60 secure the head 46 to the inner sleeve 57. The inner sleeve 57 extends beyond the outer sleeve 36 and is provided with an annular ring 61 which abuts the shoulder bearing 59. A sprocket 62 is bolted to the annular ring 61. Mandrel guides or bushings 63 and 64 are provided at either end of the inner sleeve 57 and may be of various sizes depending on the diameter of the mandrel being employed.

Figure 8:
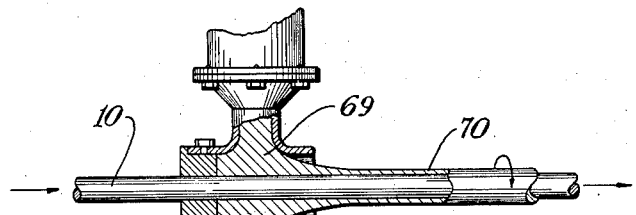
Figure 8 is an elevation, partly in section, of alternate extrusion apparatus for depositing a layer of thermoplastic substance on the mandrel of Figure 1.
Figure 7:
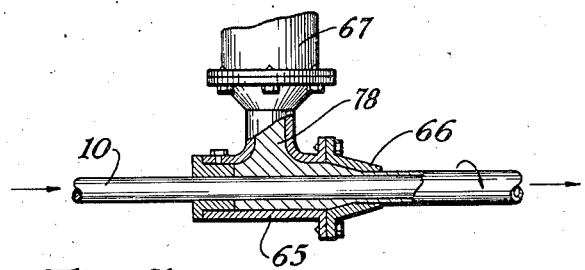
Figure 7 is an elevation, partly in section, of extrusion apparatus for depositing a layer of thermoplastic substance on the mandrel of Figure 1.

One form of extrusion head adapted to deposit a uniform coating of thermoplastic material on the rotating and traveling mandrel is shown clearly in Figure 7, wherein the mandrel 10 passes through head member 65 to which is attached an extrusion nozzle 66 having an internal diameter substantially the same as that of the desired external diameter of the thermoplastic pipe. Thermoplastic material is fed to the extrusion head under pressure, e. g. by means of a conventional forwarding worm, a part of the housing of which is shown at 67. Due to the rotation of the mandrel, the thermoplastic coating thereon as it leaves the nozzle 66 assumes a spirally ridged contour and is subsequently smoothed by the sizing and smoothing rollers 21 and 23 of Figure 1. In certain instances, as is shown in Figure 8, the extrusion nozzle 66, of Figure 7, may be dispensed with, the extrusion head 68 being merely kept full of thermoplastic material 69 and the mandrel 10 rotated and forwarded therethrough. In certain other instances, the extrusion head housing may be dispensed with entirely and the extruded thermoplastic ribbon merely wound spirally on the rotating and traveling mandrel and subsequently sized and smoothed as previously described. Due to the adherence of the thermoplastic substance to the mandrel, a substantially uniform coating 70 of the thermoplastic substance is picked up and carried forward by the mandrel as it passes through extrusion head 68. Subsequent action of the sizing and smoothing rolls 21 and 23 of Figure 1 provides a smooth uniform coating on the mandrel.

Figure 9:
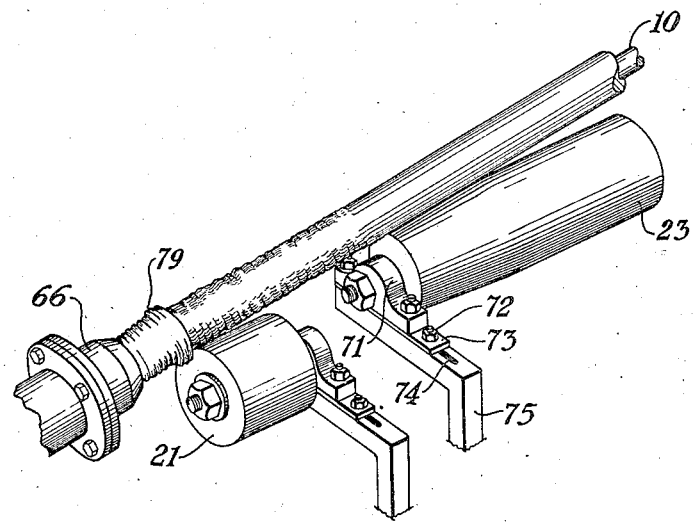
Figure 9 is an isometric view of rolls for regulating the thickness and smoothing the surface of a thermoplastic coating on a rotating and traveling mandrel.

The operation of the sizing and smoothing rolls 21 and 23 are shown in more detail in Figure 9. The axles of the rolls are supported in bearings 71, usually at one end only, and the position of the rollers with respect to the mandrel may be adjusted, e. g. by loosening nuts 72 and sliding bed plate 73 in a groove 74 cut in the supporting member 75. Similar adjustment means are provided for the sizing roller 21. As the mandrel 10 bearing its coating of thermoplastic material emerges from the extrusion head 66, the coating is spirally ridged and may be somewhat thicker than the desired wall thickness of the thermoplastic pipe. It, therefore, presses firmly against the leading edge of the sizing roller 21 and causes the latter to rotate. As the rotating mandrel moves past the rotating roller 21, the excess thermoplastic material is plowed back by the roller and the coating on the mandrel is sized accurately, its actual thickness depending upon the adjustment of the sizing roller 21. Moving the roller 21 further away from the mandrel allows a thicker coating of thermoplastic material to be carried forward by the mandrel and vice versa. The feed of thermoplastic material and/or the rate of travel of the mandrel are preferably adjusted to maintain a ridge of the material in front of the sizing roller 21 to assure full wall thickness of the thermoplastic pipe at all points.

After passing the sizing roller 21, the mandrel bearing its coating of partially smoothed thermoplastic moves past the smoothing roller 23, which, due to the slight variation in its diameter, does not retard any of the thermoplastic material on the mandrel, but merely rolls it smooth. By positioning each of these rollers at a small angle diverging in the direction of travel of the mandrel from the longitudinal axis thereof, the impression of the trailing edge of the rollers in the thermoplastic material is avoided and a smooth unblemished surface is formed on the thermoplastic pipe.

The operation of the apparatus may be clearly understood from the following description, wherein pipe is made from a polymeric vinylidene chloride product. Motors 15 and 16 driving the mandrel forwarding and rotating mechanism 14 are started and the variable speed controls 17 and 18 are adjusted to impart the desired rotational and forwarding movement to the mandrel 10. It will be readily understood by reference to Figures 5 and 6 that forwarding movement and rotational movement may be imparted to the mandrel independently and that adjustment in the rate of these movements may be made independently and while the machine is in operation. The rate of rotation of the mandrel and its forward speed may be varied over wide ranges depending on the rate of feed of the thermoplastic material, together with the size of the pipe being made. Generally speaking, the mandrel may be rotated at from 25 to 100 revolutions per minute and advanced from $\frac{1}{8}''$ to $\frac{1}{2}''$ per revolution. These rates are of particular advantage when delivering from $\frac{1}{2}$ to $1\frac{1}{2}$ pounds of thermoplastic per minute to the mandrel and when producing pipe having an internal diameter of from $\frac{1}{2}$ to $2''$. When the rotational and forwarding speeds have been established at approximately the desired values, thermoplastic material is fed to the extrusion head 19 and the rate of the feed adjusted so as to maintain a small ridge of excess thermoplastic material 20 ahead of the sizing roller 21. The sizing and smoothing rollers 21 and 23 are adjusted at a distance from the mandrel such that the smoothed coating of thermoplastic material on the mandrel, after it leaves the smoothing roller 23, is of the desired thickness and so that all of the excess material is retained by the sizing roller 21, there being no ridge of retained material ahead of the roller 23. The machine may then be run continuously.

A fine spray of cold water may be run over the thermoplastic coating on the mandrel after it passes the smoothing roller 23 to hasten the cooling and setting of the thermoplastic layer. The places where the different sections of the mandrel are joined together may be located readily by a slight depression which is formed in the thermoplastic coating over the joint and as fast as the thermoplastic coating on the leading mandrel section becomes hard enough to be self-supporting, the thermoplastic coating is cut through at the mandrel joint, e. g. with a conventional pipe cutter or in any other convenient manner, and that section of the mandrel carrying the hardened thermoplastic coating removed. The stripping of the thermoplastic pipe from the mandrel is accomplished readily and quickly by attaching the short metal bar to the mandrel tongue with a pin as shown clearly in Figure 4 and pulling the mandrel through the circular plate of the stripping mechanism illustrated in Figure 4 with a chain hoist or with any other convenient pulling means. Very little time is consumed in this stripping operation and, after detaching the metal bar used as a pulling head from the mandrel section, the section may be returned to the front end of the machine and fed into the machine as an additional section of the continuously traveling and rotating mandrel. In certain instances, it may be desirable to apply a small amount of a lubricant to the mandrel before it is coated with the thermoplastic material to facilitate easy release of the thermoplastic pipe from the mandrel section during the stripping operation. The application of such lubricant does not, however, lessen the bond between the mandrel and the thermoplastic material sufficiently to cause slippage of the thermoplastic material on the mandrel. In certain instances, also, it may be desirable to apply a small amount of lubricant to the surface of the sizing and smoothing rolls. Generally speaking, however, the use of such lubricant is not necessary.

It will, also, be appreciated that the internal diameter of the pipe which is made will depend entirely upon the diameter of the mandrel used and that to change from one size of pipe to another will require stopping the machine, removing the old mandrel, and inserting the new one having the desired diameter. Proper adjustments will necessarily also be made of the cradle rolls 12 and 25, of the position of the tapered roll members 53, 54, 55, and 56, of the mandrel guides 63 and 64, of the extrusion nozzle 66, and of the distances of the sizing and smoothing rollers 21 and 23 from the mandrel.

In making 4 inch pipe having a wall thickness of about 3/8 inch, a sizing roller 4 inches in diameter by 4 inches long, together with a smoothing roll about 15 inches long having a maximum diameter of 4 inches and tapering over the forward one-third of its length to a diameter of 3½ inches at its forward end have been used with entire satisfaction. It does not appear that the actual dimensions of these rollers are critical.

Although the apparatus has been described with particular reference to fabricating pipe from polymeric vinylidene chloride, it is apparent that any other thermoplastic substance susceptible of being heated and fed through the extrusion head of the apparatus to form a continuous coating on the mandrel may be used with equal facility. Such thermoplastic substances include, in addition to polymeric vinylidene chloride, ethyl cellulose, polyethylene, and other thermoplastic substances of comparatively sharp melting points.

This application is a continuation-in-part of our application Serial No. 453,316, filed August 3, 1942.

We claim:

In apparatus for making pipe from a thermoplastic resin, the combination including a supporting framework; a mandrel; supporting and guiding means joined to said frame-work and adapted to support and guide said mandrel; rotating means adapted to rotate said mandrel around its longitudinal axis; forwarding means adapted to forward said mandrel along its longitudinal axis; extrusion means adapted to extrude a continuous coating of a molten thermoplastic substance on the surface of said rotating and traveling mandrel; a sizing roller disposed nearly parallel to the longitudinal axis of the mandrel but with the axis of the roller divergent at an angle of from 1° to 10° from that of the mandrel in the direction of travel of the mandrel and with its periphery spaced apart from that of the mandrel a distance equal to the desired wall thickness of the pipe; and an idler roller beyond said sizing roller similarly disposed with respect to the axis and periphery of the mandrel, having a frusto-conical portion, with its smaller end directed toward the extrusion means, continuous with a cylindrical portion forming at least half of the roller and at the divergent end thereof.

WILBUR T. STEPHENSON.
JAMES A. PALMER.